United States Patent [19]

Luttmer et al.

[11] Patent Number: 4,982,509
[45] Date of Patent: Jan. 8, 1991

[54] MEASUREMENT SYSTEM HAVING MULTIPLE DISPLAY ORIENTATIONS

[75] Inventors: David J. Luttmer, Glenshaw; Thomas L. Panian, Allison Park; Barry D. Wixey; Raymond L. Wilson, both of Pittsburgh, all of Pa.

[73] Assignee: Delta International Machinery Corp., Pittsburgh, Pa.

[21] Appl. No.: 233,498

[22] Filed: Aug. 19, 1988

[51] Int. Cl.$^5$ ................................................ G01B 7/04
[52] U.S. Cl. ...................................... 33/706; 33/784
[58] Field of Search ............... 33/707, 708, 709, 784, 33/820, 185, 706; 340/870.37

[56] References Cited

U.S. PATENT DOCUMENTS

| | | |
|---|---|---|
| D. 257,009 | 9/1980 | Sibukawa et al. . |
| D. 257,012 | 9/1980 | Sibukawa et al. . |
| 280,301 | 8/1985 | Nashina et al. . |
| 2,875,524 | 3/1959 | Bower et al. ............... 33/708 |
| 3,622,760 | 11/1971 | Chumley . |
| 3,626,159 | 12/1971 | Chumley . |
| 3,873,916 | 3/1975 | Sterki ....................... 340/870.37 |
| 3,942,895 | 3/1976 | Meyer et al. ............... 33/707 |
| 4,062,120 | 12/1977 | Lacagnina et al. ......... 33/820 |
| 4,103,427 | 8/1978 | Ledley, III ................. 33/820 |
| 4,229,883 | 10/1980 | Kobashi . |
| 4,255,861 | 3/1981 | Nakata et al. .............. 33/820 |
| 4,272,821 | 6/1981 | Bradus . |
| 4,403,859 | 9/1983 | Ernst ......................... 33/707 |
| 4,586,260 | 5/1986 | Baxter et al. ............... 33/706 |
| 4,600,184 | 7/1986 | Ashworth . |
| 4,612,656 | 9/1986 | Suzuki ewt al. . |
| 4,641,557 | 2/1987 | Steiner et al. . |
| 4,677,755 | 7/1987 | Iwano et al. . |
| 4,694,275 | 9/1987 | Cox . |

FOREIGN PATENT DOCUMENTS

| | | | |
|---|---|---|---|
| 629285 | 10/1961 | Canada ..................... | 33/707 |
| 3346273 | 7/1984 | Fed. Rep. of Germany ........ | 33/784 |
| 3436681 | 5/1985 | Fed. Rep. of Germany ........ | 33/706 |
| 214712 | 12/1984 | Japan ....................... | 340/870.37 |
| 1030825 | 7/1983 | U.S.S.R. .................. | 33/1 PT |
| 2022843 | 12/1979 | United Kingdom ........ | 33/706 |

OTHER PUBLICATIONS

Mitutoyo brochure, data unknown.

*Primary Examiner*—Thomas B. Will
*Attorney, Agent, or Firm*—Merchant, Gould, Smith, Edell, Welter & Schmidt

[57] ABSTRACT

Disclosed is a measurement system having multiple display orientations. The measurement system comprises a reader head having a reader element, and a display module. The reader element is configured for lateral movement with respect to a calibrated reference member for making a measurement relative to a reference position on the calibrated reference member. The display module is for displaying a measurement and includes coupling hardware for connecting the display module to the reader head so that the display module can be read horizontally independent of whether the reader head is oriented horizontally, vertically, or in some other direction.

12 Claims, 15 Drawing Sheets

MEASUREMENT SYSTEM HAVING MULTIPLE DISPLAY ORIENTATIONS

BACKGROUND OF THE INVENTION

The present invention relates to measurement systems. Although disclosed in the context of a tool the present invention is not limited to such applications. Those skilled in the art will recognize that the present invention is broadly applicable to measurement systems in general.

SUMMARY OF THE INVENTION

A measurement system having multiple display orientations is provided. The measurement system comprises reader head means having a reader element, and display means. The reader element is configured for lateral movement with respect to a calibrated reference member for making a measurement relative to a reference position on the calibrated reference member. The display means is for displaying a measurement and includes coupling hardware for connecting the display means to the reader head means so that the display means can be read horizontally independent of whether the reader head means is oriented horizontally, vertically, or in some other direction.

DETAILED DESCRIPTION OF THE PREFERRED EMBODIMENTS

Detailed preferred embodiments of the present invention are disclosed. It is to be understood, however, that the disclosed embodiments are merely exemplary of the invention, which may be embodied in various forms. Therefore, specific structural and functional details disclosed are not to be interpreted as limiting, but rather as a representative basis for teaching one skilled in the art to variously employ the present invention in virtually any appropriately detailed system or structure. It will be understood that in some circumstances relative material thicknesses and relative component sizes may be shown exaggerated to facilitate an understanding of the invention.

Figure 7:
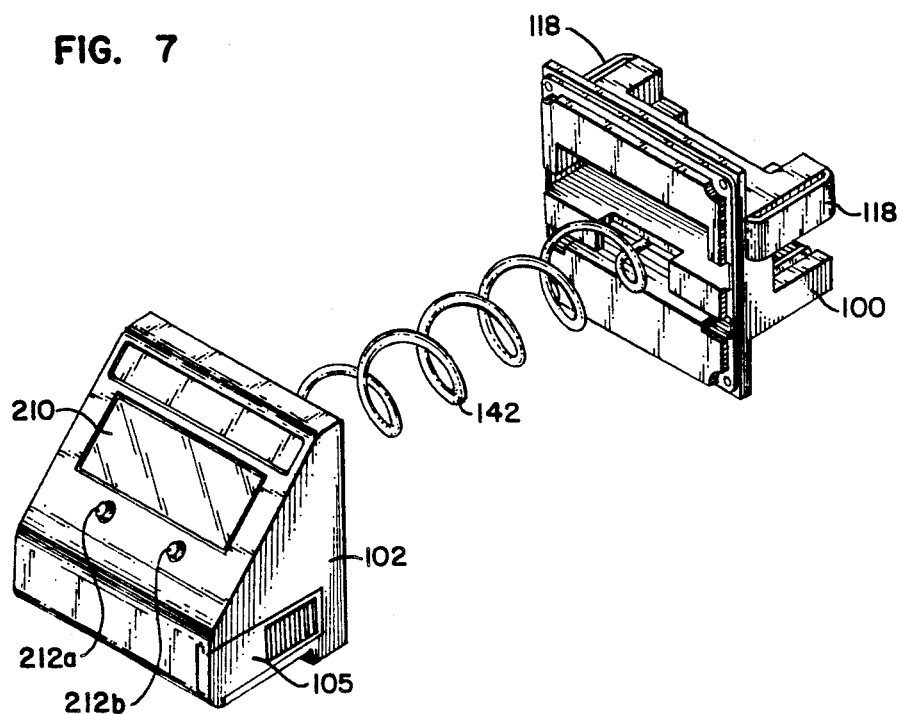
FIG. 7 illustrates a display module remotely coupled to a reader head.

The present invention relates to an electronic measurement system which has the flexibility to be used in a great variety of systems and apparatus. The present invention has several unique preferred features including a two piece reader head 100 and display module 102, which can be assembled for vertical, horizontal or remote applications, examples of which are shown in FIGS. 8, 1, and 7, respectively.

Figure 1:
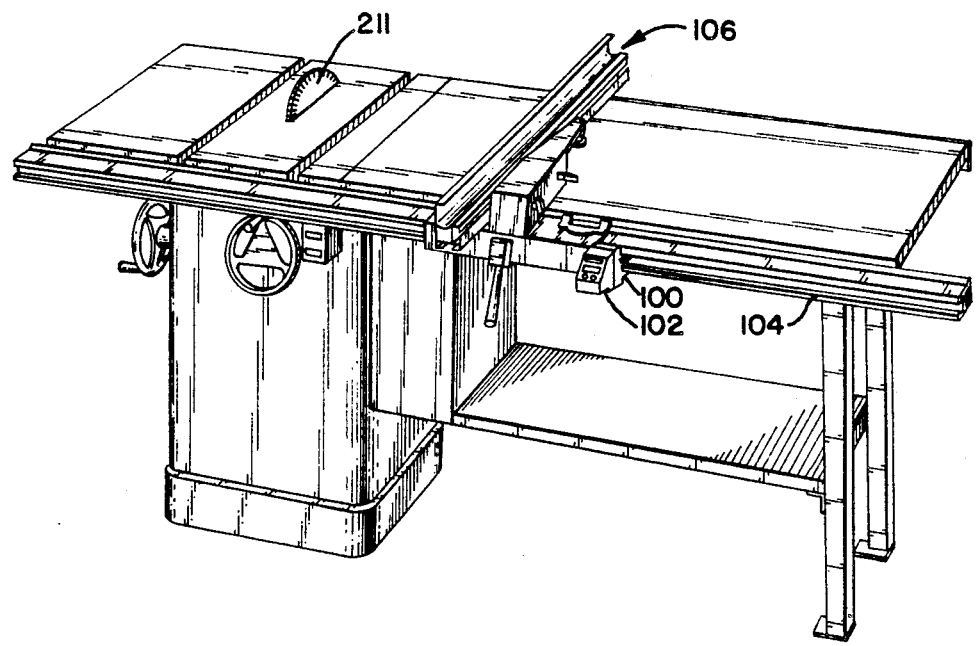
FIG. 1 illustrates the present invention in use with a tilting arbor table saw.

As illustrated in FIG. 1, the tracking design of preferred reader head 100 is configured to ride directly on a Unifence ® saw guide 106 front guide rail 104 manufactured by Delta International Corp., 246 Alpha Drive, Pittsburgh, Pa., 15238. Unifence ® saw guide 106 is described in more detail in U.S. Pat. No. 4,600,184. Alternately, preferred reader head 100 can be retrofitted to virtually any tool or other system requiring a measurement through the use of an auxiliary guide rail such as rail 108 shown in FIG. 8. As illustrated, auxiliary guide rail 108 is in a vertical orientation for use with a thickness planer 110. Auxiliary guide rail 108 can be obtained or fabricated in any length desired and can be installed in any orientation. It can also be retrofitted to virtually any existing system, including a table saw having an existing front guide rail for use with an existing saw guide or fence, to a drill press, to a shaper, or to many other tools or systems requiring a measurement system.

Figure 2:
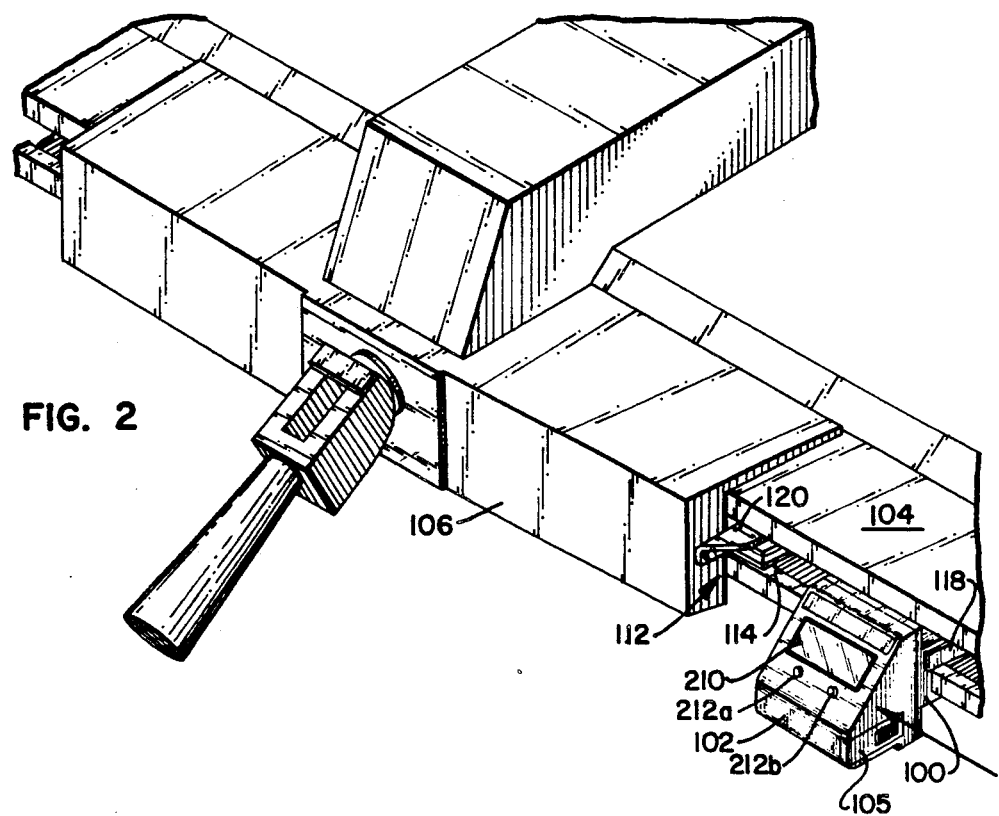
FIG. 2 illustrates a measurement system reader head and display module in working relationship with a table saw front guide rail, the Figure also illustrating a magnetic coupler attached to the table saw fence.
Figure 3:
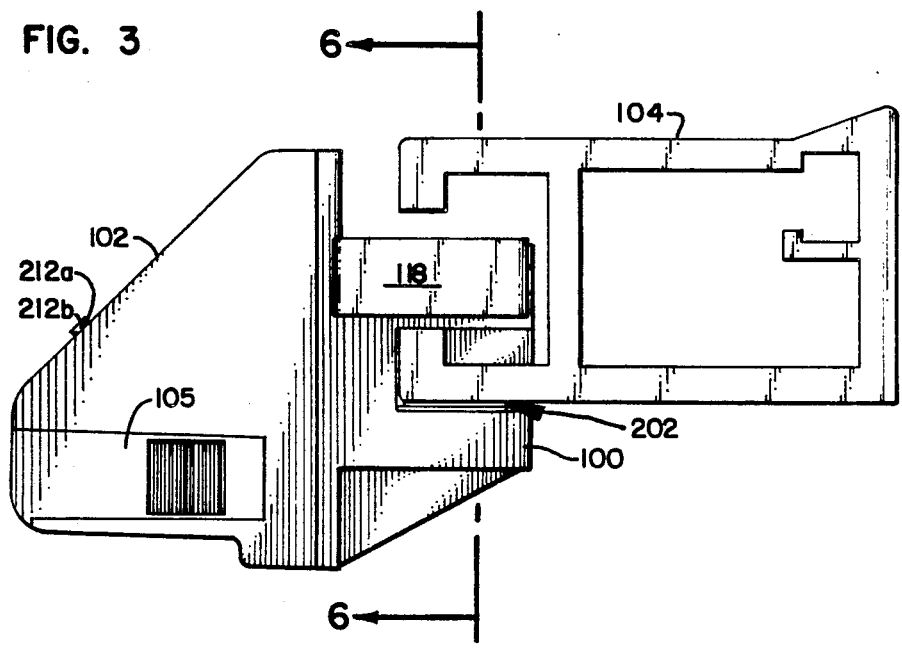
FIG. 3 illustrates a side view of a measurement system display module and reader head in working relationship with a cross sectional view of a table saw front guide rail.
Figure 4:
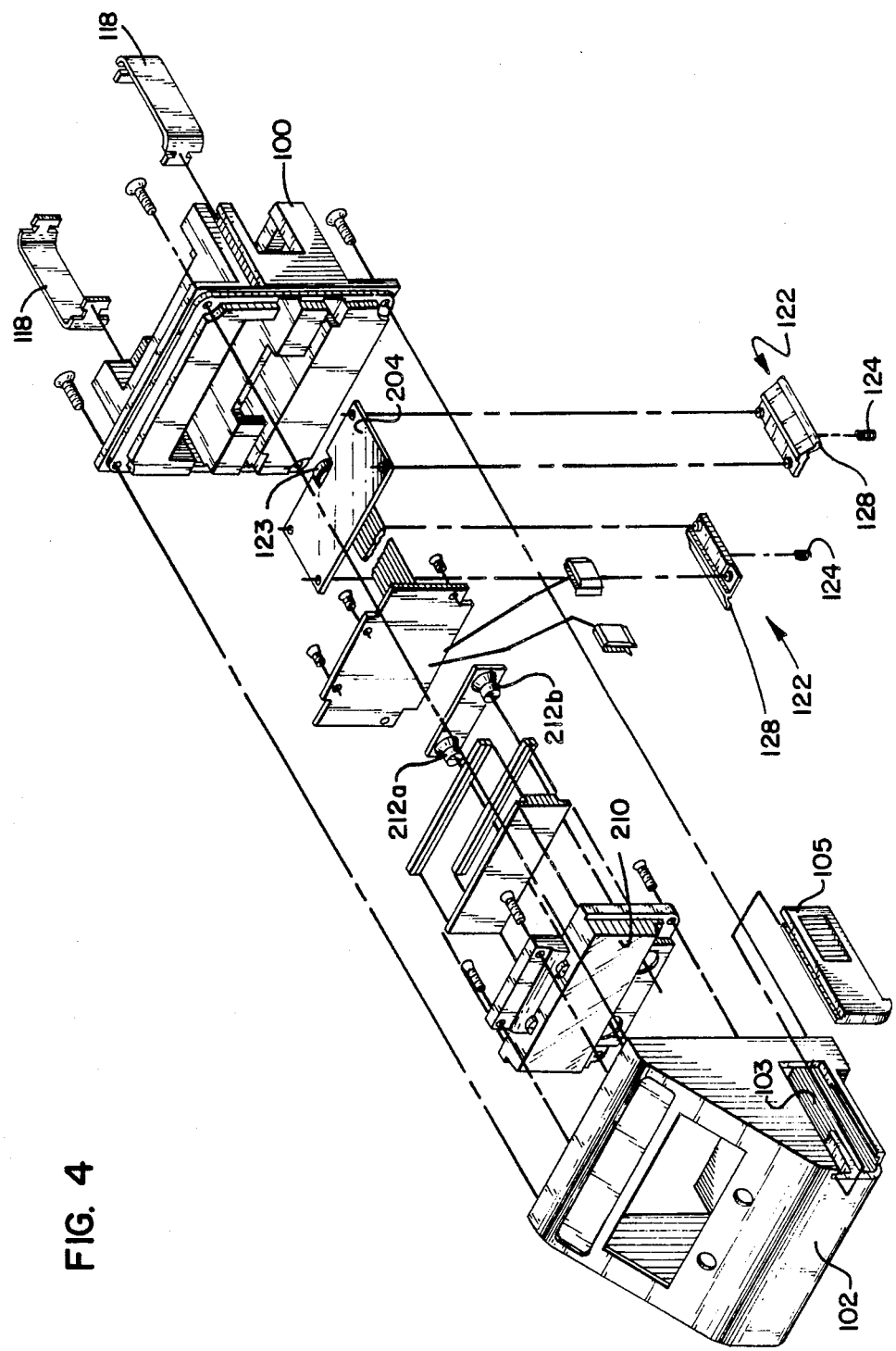
FIG. 4 is an exploded view of a display module and reader head.
Figure 5:
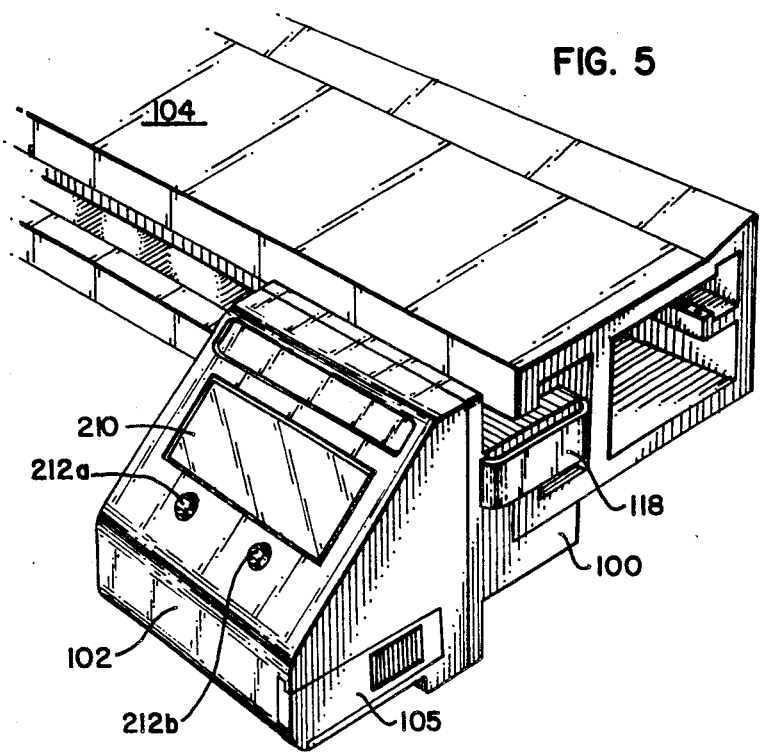
FIG. 5 illustrates a perspective view of a measurement system reader head and display module in working relationship with a guide rail.
Figure 8:
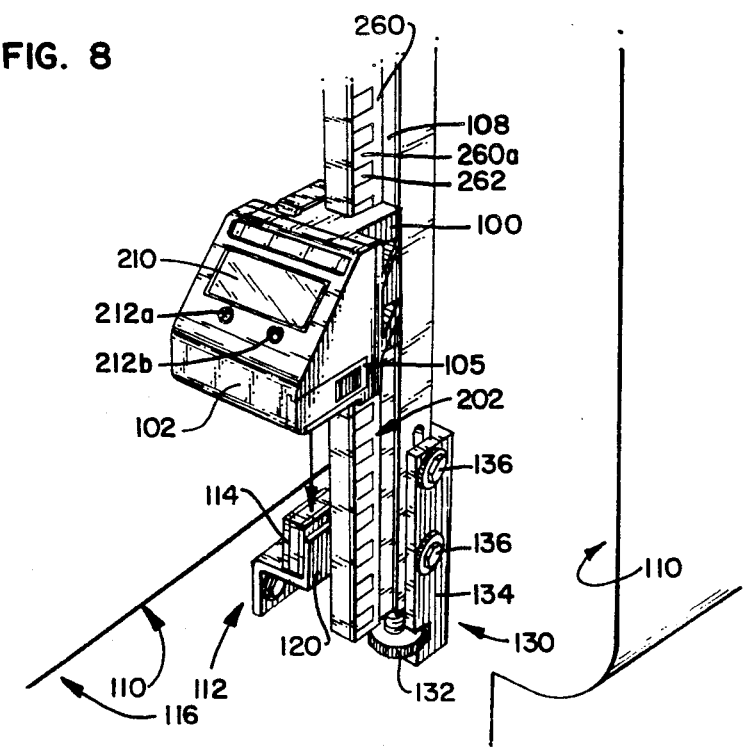
FIG. 8 illustrates a measurement system in a vertical orientation in working relationship with a thickness planer, the Figure also illustrating a magnetic coupler attached to the table of the thickness planer.

A preferred measurement system shown in FIG. 2, incorporates magnetic coupler means 112 comprising a magnet 114 for coupling reader head 100 to a physical structure such as fence 106, planer table 116, FIG. 8, or other structure by magnetic attraction between the magnet, the reader head, and the structure.

In the preferred embodiment, shown in FIGS. 2-6, reader head 100 comprises a ferrous surface formed on each side of the reader head in the form of metal side plates 118, while magnetic coupler means 112 comprises a bracket 120 for connecting magnet 114 to physical structure such as saw fence 106, planer table 116, or other structure. This embodiment permits use of the present system with physical structure that does not already include ferrous material. Alternately, reader head 100 may comprise magnetic side plates such as 118, which can be integrally formed with reader head 100 and directly coupled to a physical structure comprising a ferrous material.

Magnetic coupler means 112 has many advantages, including accurate and repeatable coupling and positioning of the reader head with physical structures to be tracked for measurement location, while at the same time forming not only an easy disconnect means but also means for permitting the connection between reader head 100 and the physical structure to flex, e.g., during adjustments or removal of a fence such as 106 or during adjustment or removal of other physical structure requiring coupling with a measurement system. For example, in connection with a saw fence application, magnetic coupler means 112 can be used to connect the reader head/display module assembly to the moveable portion of the fence that travels along a front guide rail. In this application, magnetic coupler means 112 ensures precise positive alignment in the direction of travel, and allows movement and misalignment in the other two directions. This enables a table saw fence measurement system to be accurate, and it allows easy removal of the fence from the saw.

Preferred auxiliary guide rail 108 has a cross-sectional configuration similar to the geometry a Unifence ® saw guide 106 front guide rail 104. As previously indicated, auxiliary guide rail 108 may be mounted either horizontally, vertically or in some other orientation, in a variety of applications. For example, a long length of auxiliary guide rail 108 can be integrated with an existing generic table saw front guide rail and saw fence in order to replace or enhance an analog mechanical measurement system. Those skilled in the art will recognize that an analog mechanical measurement system having a human-readable graduated scale and a mechanical indicator for use in reading the graduated scale is subject to human error due to the interpretation required in reading the system. As will be further described below, the present electronic measurement system eliminates this human error by providing extremely precise, direct measurements. Further, through the use of an auxiliary guide rail, such as 108, for guiding the lateral movement of reader head 100 and through the use of magnetic coupler means 112 for coupling the reader head with a physical structure such as an existing tool fence, an existing analog mechanical measurement system can easily be replaced or enhanced.

Figure 10:
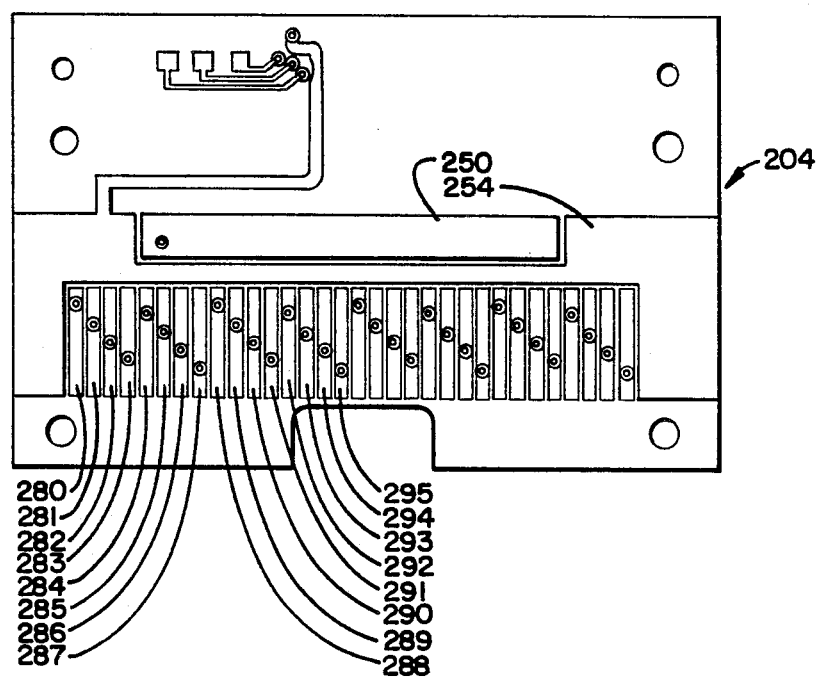
FIG. 10 illustrates a reader element.
Figure 11:
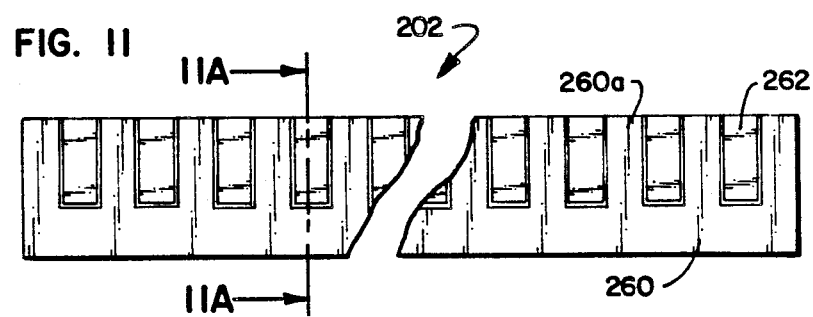
FIG. 11 illustrates a reader strip or calibrated reference member forming a portion of a preferred reader reference means.

In operation, guide rails such as 104 and 108 form a reader reference means comprising a reader strip or calibrated reference member such as 202, shown in FIG. 11, for use with reader head 100 in making a measurement. In the preferred embodiment, reader strip or calibrated reference member 202 comprises metalized signal regions 262 which form one element of a capacitor. Further, reader head 100 comprises a reader element such as 204, shown in FIGS. 10 and 12, which is preferably configured to move laterally with respect to reader strip or calibrated reference member 202. In the preferred embodiment, reader element 204 comprises metalized reader regions such as reader regions 280 through 295, which comprise the other element of the capacitor. The manner in which calibrated reference member 202 and reader element 204 interact to provide a measurement will be described below.

Figure 11A:
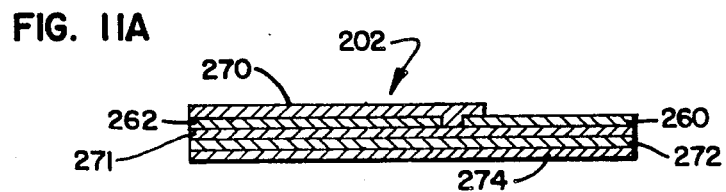
FIG. 11a is a cross sectional view of a preferred reader strip or calibrated reference member.

FIG. 11a illustrates a preferred embodiment reader strip or calibrated reference member 202, preferably comprising a substrate layer 271 which provides a basic physical support structure for reader strip or calibrated reference member 202. Reader strip or calibrated reference member 202 further comprises a layer of pressure sensitive adhesive 272 attached to the surface opposite the surface carrying metalized signal regions 262. A removable protective covering 274 is placed over the layer of pressure sensitive adhesive 272 for protecting the adhesive until the time that the reader strip or calibrated reference member is to be installed.

Preferred reader strip or calibrated reference member 202 comprises a metalized pattern on the surface opposite the adhesive 272 surface. As shown in FIG. 11, the pattern comprises a metalized ground strip 260 and a plurality of metalized ground regions 260a, each having a predetermined width and parallel sides oriented perpendicular to the length of metalized ground strip 260. Metalized ground regions 260a are spaced a predetermined distance from one another and are conductively coupled to metalized ground strip 260.

As previously indicated, the metalized pattern of preferred reader strip or calibrated reference member 202 further comprises metalized signal regions 262 alternately located between metalized ground regions 260a. Metalized signal regions 262 also have a predetermined width and parallel sides oriented perpendicular to the length of metalized ground strip 260. Signal regions 262 are spaced a predetermined distance from one another and from metalized ground regions 260a, with metalized signal regions 262 being electrically isolated, both from one another and from metalized ground strip 260. In a preferred embodiment, the metalized pattern comprises nickel plated copper and a protective dielectric layer 270 which covers the metalized ground and signal regions.

Preferred metalized reader regions such as reader regions 280 through 295 illustrated in FIG. 10 also have a predetermined width and parallel sides. Similarly, the reader regions are spaced a predetermined distance from one another, the reader regions also being electrically isolated from one another.

In operation with the present system, preferred adhesive backed reader strip or calibrated reference member 202 is attached to a guide rail such as 104 or 108, and reader element 204 is secured in reader head 100 so that the sides of signal regions 262 are parallel to the sides of the reader regions such as reader regions 280 through 295, with reader element 204 and its corresponding reader regions moving laterally with respect to reader strip 202 and its corresponding signal regions 262.

The most critical area of an electronic measurement system, whether capacitive, magnetic, optical, or resistive, is frequently how the reader head components, particularly reader element components, maintain a precise relationship to a reader strip or calibrated reference member in order to give a high degree of resolution and accuracy. For example, in typical prior art electronic caliper capacitive measurement systems, and in electronic measurement systems such as those disclosed in U.S. Pat. No. 4,694,275, it is extremely important that capacitive reader elements are in substantially intimate contact with capacitive signal elements, the two elements typically being separated only by a thin layer of dielectric. In the system disclosed in U.S. Pat. No. 4,694,275, for example, the capacitive reader element and the capacitive signal element are biased together in a rubbing relationship by using a foam bias, with the two capacitive elements being separated only by a thin dielectric layer. Unfortunately, this dielectric layer is subject to wear. In alternate approaches, such as those typically used in precisely machined caliper systems, the precise relationship required between the capacitive reader elements and the capacitive signal elements is maintained through precision machining of the corresponding reader head and guide rail.

The electronics of the present system permit a variable standoff to be employed between reader element 204 and reader strip or calibrated reference member 202 while still maintaining extremely precise measurements. Accordingly, it has been found that the necessary precision in defining the physical relationship between reader element 204 and reader strip or calibrated reference member 202 can be accomplished through preferred standoff means for establishing a variable standoff distance between the reader element and the reader strip or calibrated reference member while substantially invariably maintaining a fixed lateral position of the reader element within the reader head.

Figure 6:
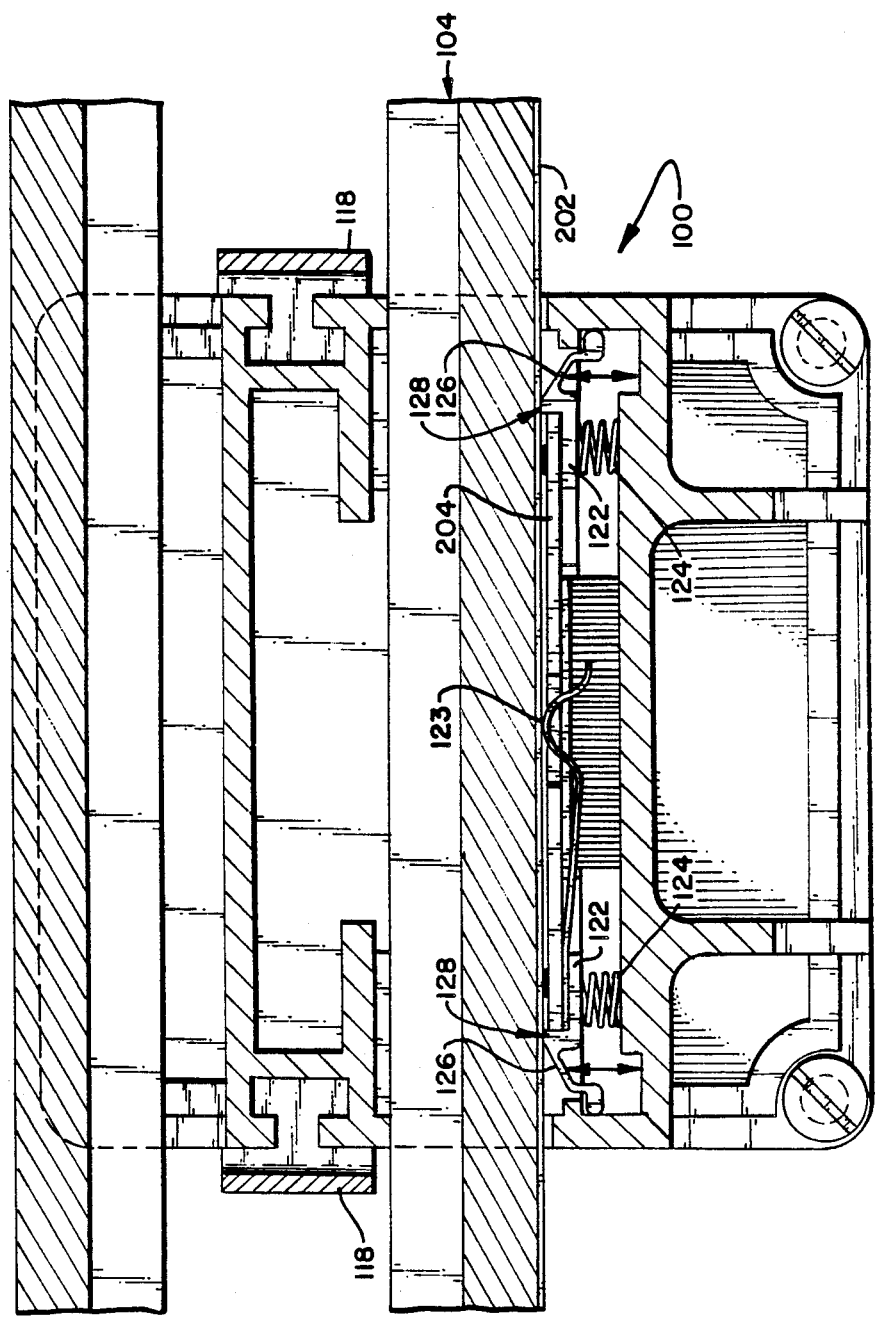
FIG. 6 is a cross sectional view of a preferred reader head in working relationship with a guide rail.

In the preferred system, this is accomplished by a unique and inexpensive approach which permits use of a circuit board to form the body of reader element 204, which permits the use of an inexpensive extrusion for forming the body of reader module 100, and which permits use of inexpensive extruded material for guide rails such as 104 or 108. Additional components used in the preferred system to accomplish this, which are shown in FIG. 6, include two wiper springs 122, one wiper standoff mechanism 123, preferably formed of plastic, and two compression springs 124. Wiper springs 122 are preferably bonded to reader element 204 and are used in the preferred embodiment to perform several functions. First, as can be seen in FIG. 6, leaf spring sections 126 are deformed toward each other and maintain a preload when the reader element/leaf spring assembly is inserted into reader head 100. This preload prohibits reader element 204 from moving laterally with respect to the reader module. Second, a small wiper lip 128 on each wiper spring 122 spaces reader element 204 at a nominally constant standoff distance from the surface of reader strip or calibrated reference member 202. In addition, wiper standoff mechanism 123 pushes reader element 204 away from reader strip 202 and wipes reader strip 202 clean of dust and debris. Further compression springs 124 push wiper springs 122 against reader strip 202. The combination of wiper standoff mechanism 123 and compression springs 124 cause each wiper lip 128 to maintain continuous contact with reader strip 202 and to wipe it clean of dust and debris.

Preferably, spring forces and materials are precisely matched to insure &.hat the wiper spring/circuit board assembly can float up and down in the direction of compression springs 124 while at the same time insuring that there is no lateral movement of reader element 204 in reader head module 100 as module 100 is moved back and forth along reader strip or calibrated reference member 202. Using this approach, all components may be inexpensively manufactured using standard liberal tolerances, while still maintaining a high degree of resolution and accuracy, which is only maintained in other designs by extremely strict tolerances and precision machining or by a rubbing relationship between the reader and reader strip elements, such as in the system disclosed in U.S. Pat. No. 4,694,275.

As previously indicated, in the preferred embodiment, signal regions 260 of reader strip or calibrated reference member 202 comprises one element of a capacitor, and reader element 204 comprises the other element of the capacitor. However, the present standoff system could apply equally well to use with optical, resistive, or magnetic measurement systems where precise lateral positioning of the reader element within a reader head is desired, while at the same time permitting a variable standoff to occur whenever perturbations such as those encountered with inexpensive guide rail extrusions are encountered.

As has previously been indicated, the present system has multiple reader head display orientations. Reader head 100 and display module 102 may be connected so that display means 210 can be read horizontally independent of whether a guide rail such as 104 or 108 or other reader reference means is oriented horizontally (as in FIGS. 1), vertically (as in FIG. 8) or in some other direction. Horizontal orientation of display 210, as shown in FIG. 7, in connection with virtually any orientation of a guide rail or other reader reference or in connection with a remote location of display module 102 from reader head 100 can be accomplished through remote connection means 142. As is illustrated in FIG. 7, remote connection means 142 may comprise a cord connection for remotely connecting display module 102 to reader head 100. In the preferred system, all installations, whether horizontal, vertical, or remote, use the same hardware, with remote connection means 142 being used for remote installation of display module 102.

Examples of using a remote location with display module 102 include use of the present system with a shaper, with reader head 100 typically being coupled with a vertical guide track such as 108 to the spindle elevation system below the shaper table, and with display module 102 being located in a convenient location on the exterior of the shaper, typically somewhere above the shaper table.

Based on present plans, various elements of the present system will be available from Delta International Corp. in standard kits as follows. A kit for use in retrofitting the present system to a Unisaw ® tilting arbor saw or other table saw having a Unifence ® saw guide will be available under part no. 32-010 and will include preferred reader head 100, display module 102, preferred reader strip or calibrated reference member 202, and hardware with which to configure magnetic coupler means 112. A vertical kit comprising a relatively short guide rail such as 108, reader head 100, display module 102 and remote connection means 142, and reader strip or calibrated reference member 202 will be provided under part no. 32-011. Preferred reader strip or calibrated reference member 202 will be available under part no. 32-012, and a long length of guide rail such as 108 together with miscellaneous mounting hardware will be available under part no. 32-013.

Vertical kit 32-011 will also include adjustment hardware 130 comprising a slotted bracket 134 for receiving guide rail 108 and for adjusting the elevation of guide rail 108 through the use of a threaded adjustment knob 132. Adjustment hardware 130 further typically comprises locking means 136 for locking guide rail 108 into a fixed location following its vertical height adjustment. Locking means 136 may comprise threaded locking bolts which pull guide rail 108 tightly against one surface of the slot in bracket 134. This is a particularly important feature when using a vertical kit with a tool such as a planer where the planer cutting blades may be below the upper surface of a work bench or table. The vertical kit would thus combine the mechanical and electronic adjustments.

Figure 9:
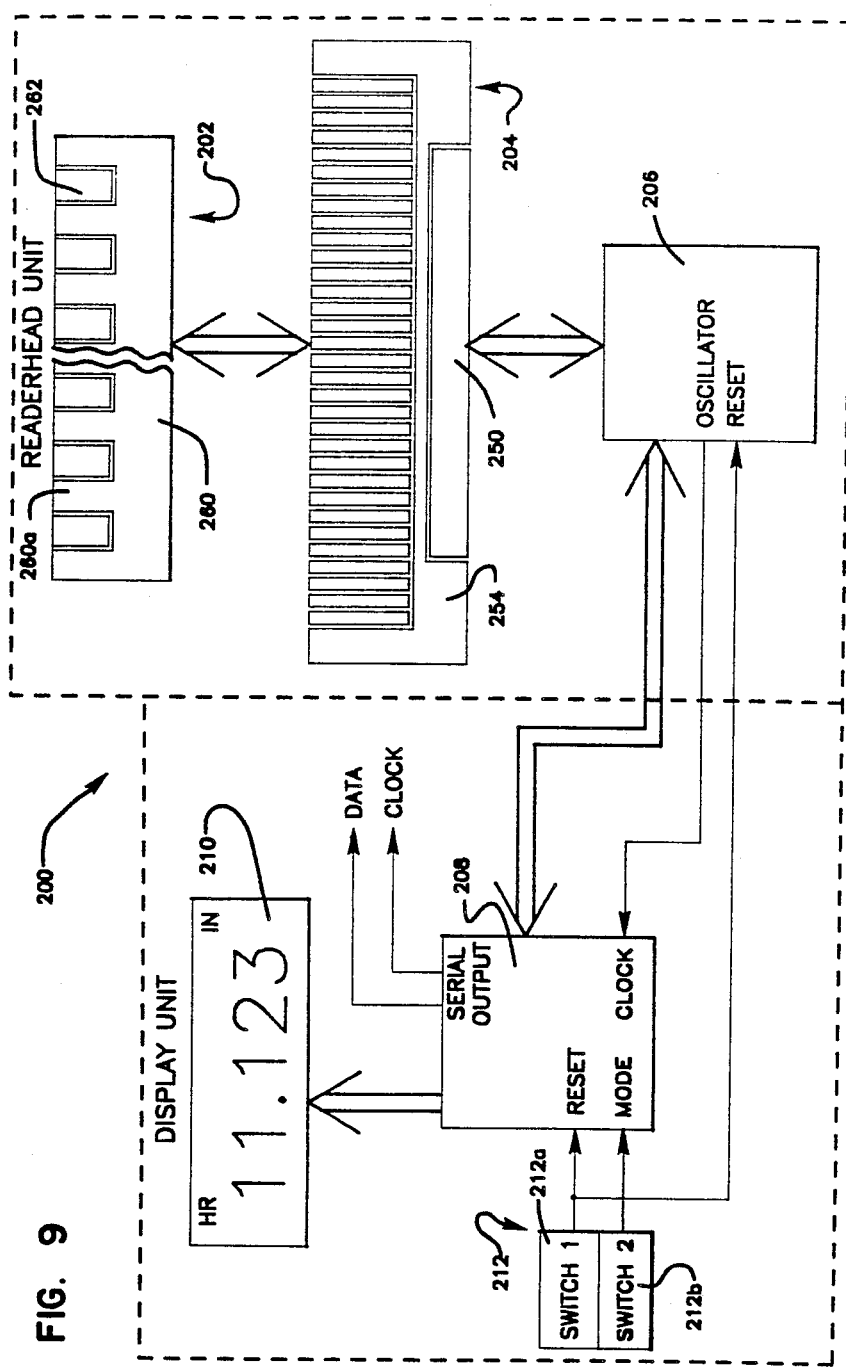
FIG. 9 is a block diagram of the present measurement system.

In using the present system, illustrated in block diagram form in FIG. 9, the preferred system software waits after power-up for the user to press a zero key 212a before producing a display. For use with a table saw, as depicted in FIG. 1, the user would typically slide fence 106 down guide rail 104 until fence 106 reaches the saw blade. To establish this position as the reference point, the user presses zero key 212a. The display will then read "0.00" in any of the available measurement units. The preferred software is then ready to accept further key inputs.

To select preferred directional options available throughout the present system, e.g., right-of-blade or left-of-blade (ROB/LOB), the user presses zero key 212a as described in Table 1 below. When the desired option is obtained, the zero key is released. In the "right-of-blade" option, movement to the right is considered positive, while movement to the left is considered negative. In the "left-of-blade" option, these polarities are reversed. In the preferred embodiment, this option is denoted by an "L" on the left of display means 210.

Accordingly, the present system comprises first mode display means for increasing the measurement as reader element 204 moves away from a first side of a reference position and for decreasing the measurement as reader element 204 moves toward the first side of the reference position. The present system further comprises second mode display means for increasing the measurement as the reader element moves away from the other side of the reference position and for decreasing the measurement as the reader element moves toward the other side of the reference position. In a table saw environment, such as FIG. 1, these modes of operation comprise right-of-blade mode display means for increasing the measurement as saw fence 106 moves away from the right side of the saw blade and for decreasing the measurement as saw fence 106 moves toward the right side of the saw blade. In this configuration, the present system further comprises left-of-blade mode display means for increasing the measurement as saw fence 106 moves away from the left side of blade 211 and for decreasing the measurement as fence 106 moves toward the right side of the saw blade.

To select the desired precision, or resolution, options, the user presses mode key 212b as described in Table 1. When the desired option is obtained, the mode key is released. In the preferred embodiment, a low resolution option provides measurements in increments of 0.005 inches or 0.1 millimeters, and a high resolution option provides measurements in increments of 0.001 inches or 0.01 millimeters. In preferred display means 210, the high resolution option is denoted by "HR" on the left of the display. The low resolution option is more than adequate for table saws, while the high resolution option may be required for other applications, such as thickness planers. Neither option affects a fractional mode, which in the preferred embodiment always provides measurements in increments of 1/32 inch.

Accordingly, the present system comprises means for displaying a measurement in both decimal and fractional units, for displaying the measurement in both English and metric units, for establishing a zero reading at any location of reader head 100, and for providing the measurement in either of two ranges of precision, e.g. high or low resolution.

Once the options have been selected after power up and the present system has been "zeroed" to a blade or other reference position, the present system is ready for use as an accurate device for measuring distance from the reference position. After work is done and the present system is idle, the user may turn off display 210 in order to prolong battery life. Although this is not necessary, it is provided as an option to the occasional user, such as a home shop craftsman who does not use a saw as often as, for example, a cabinet maker. In the preferred embodiment, the standby option is selected when the user first presses and holds zero key 212a then quickly presses the mode key within one second. Preferred display 210 then goes blank, and the software stops executing. Table 1 provides a summary of keys and related functions which comprises the human interface of the preferred electronic measurement system (EMS).

TABLE 1

Summary of Keys

ZERO

Pressed once:
"Wakes-up" EMS from Standby Mode, turns display 210 on, resets EMS.
Sets current fence position as new reference point (zero).
Pressed and Held Two (2) Seconds:
Toggles EMS between Left-of-Blade, Right-of-Blade Option. Changes every 2 seconds if held down.

MODE

Pressed once:
Toggles display 210 through Inch/Millimeter/Fraction Modes.
Pressed and Held Two (2) Seconds:
Toggles EMS between High Resolution/Low Resolution option. Changes every 2 seconds if held down.

ZERO + MODE

In the preferred embodiment, done in this sequence:
Press and Hold ZERO then quickly press MODE.
This puts EMS in Stand-by Mode and blanks display 210. Used when EMS will be idle for a long period of time.

Note that, in woodworking and other applications, the present system provides the ability to retrofit a measurement system to a device that is presently relatively imprecise in order to make the device perform with extremely high precision. In addition, it can be used to create new designs of such devices having extremely high precision, and it can be used to increase further the precision of what are presently relatively precise devices. For example, by providing a guide rail such as 108 in conjunction with the cross cutting fence of a radial arm saw or power miter box, and by using a stop member in conjunction with reader head 100/display module 102, a "zero" length for a cross cut can easily be set by referencing off of a blade tooth, and the exact length of cut desired can be made the first time by moving reader head 100 to the desired location, reading the exact dimension off of display module 102, and using the stop member as a guide for positioning the workpiece before making the cut.

Further, such a measurement for cutting a workpiece can be accomplished without human interpretation of a mechanical analog scale. In addition, the exact workpiece dimension can be obtained in one try, providing a huge increase in productivity and savings in material cost, since wasted effort and materials due to inaccurate cuts can be eliminated.

Further, the exact dimension of a workpiece can be established, not only without human interpretation of an analog scale, but the dimension can be made and displayed in various formats, such as in either decimal or fractional form and in either English or metric units. The use of decimal units permits use of conventionally available high precision measurement systems such as calipers to measure the desired dimension of a workpiece (e.g., to fit into a known location in a carcase) and to duplicate the exact dimension by using decimal units in display module 102. Thus, no unit conversion table or separate calculation is necessary. On the other hand, use of fractional units such as the 1/32 inch increments available through the preferred system permits a woodworker accustomed to English fractional units to use them. Alternately, use of metric units permits working directly to European metric standards. Again, all of these selections can be made and used without the human interpretation required to read mechanical analog scales, and without the need to manually convert to the desired units of measurement.

Note further that, through the use of a standard configuration guide rail such as 108 on all tools or other devices where increased measurement precision is desired and, through the use of magnetic coupling means 112, the occasional user can quickly and easily share a single reader head 100/readout module 102 among a large variety of devices, thus greatly enhancing productivity and precision at a relatively low cost.

Referring now to FIG. 9, as previously indicated the components of preferred electronic measurement system (EMS) 200 combine to provide the user with an accurate digital representation of linear movement displayed in English or metric units in both directions along a single axis, which may be oriented vertically, horizontally or in some other direction. EMS 200 comprises reader reference means 202, reader element 204, motion detection means 206, logic means 208, display means 210 and user keypad 212 comprising keys 212a and 212b.

Figure 12:
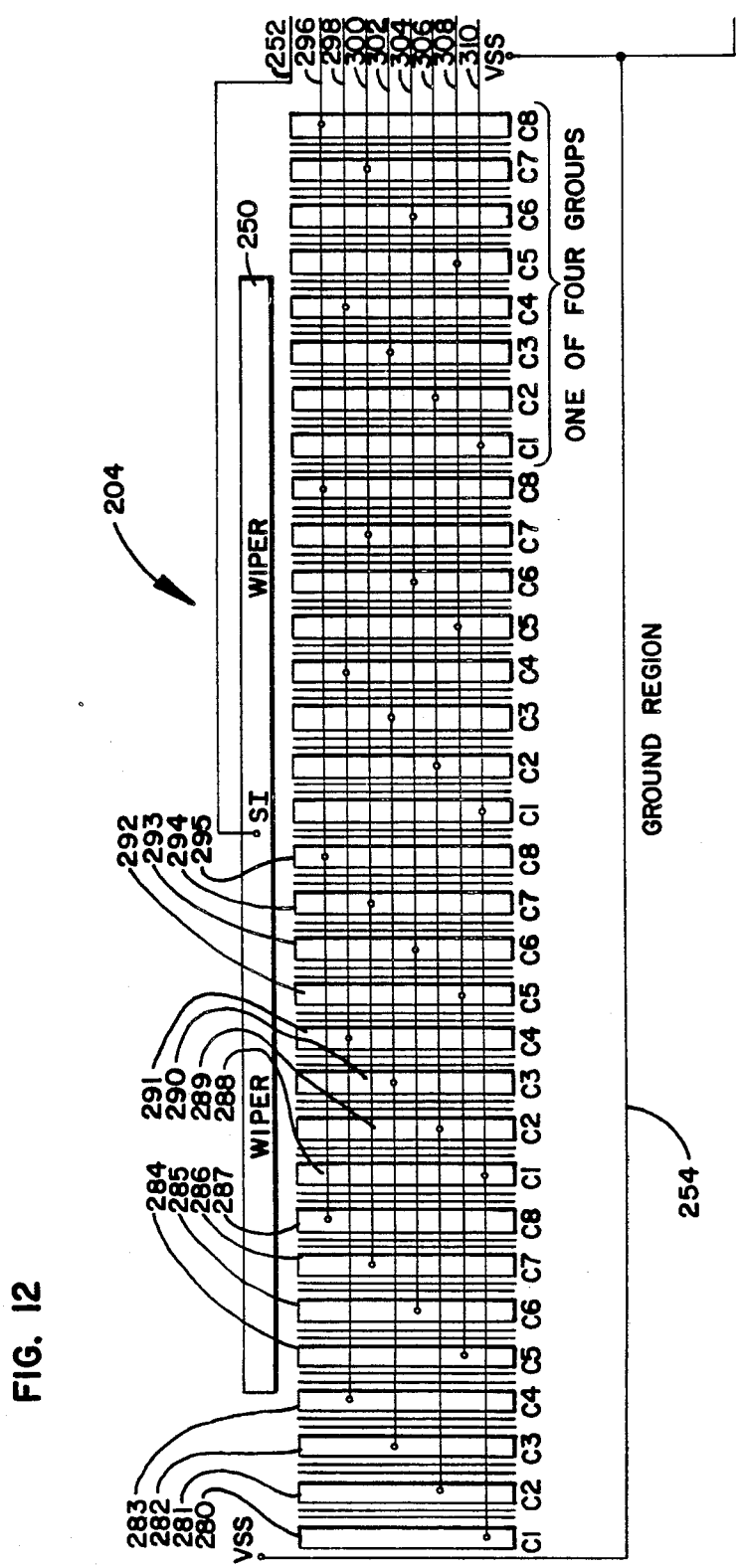
FIGS. 12-15 illustrate preferred electronics for use in connection with the present system.

An embodiment of reader head 100 comprising reader element 204 is shown in FIG. 12. FIG. 12 shows a plurality of preferred reader regions 280 through 295 which form one element of a capacitor with preferred metalized signal regions 262 (See FIG. 11) forming the other element of the capacitor. In the preferred embodiment, reader regions 280 through 287 form a group of eight reader regions which receive eight different waveforms. Each group of eight reader regions in reader element 204 are electrically coupled together through electric couplers 296, 298, 300, 302, 304, 306, 308 and 310. For example, reader region 280 is coupled to reader region 288 through electric coupler 296. Reader region 281 is coupled to reader region 289 through electric coupler 298. Reader region 282 is coupled to reader region 290 through electric coupler 300. Reader region 283 is coupled to reader region 291 through electric coupler 302. Reader region 284 is coupled to reader region 292 through electric coupler 304. Reader region 285 is coupled to reader region 293 through electric coupler 306. Reader region 286 is coupled to reader region 294 through electric coupler 308. Finally, reader region 287 is coupled to reader region 295 through electric coupler 310. As a result, reader region group 280 through 287 receives the same waveforms as reader region group 288 through 295. Similarly, the other two reader region groups receive the same waveforms. Thus, each of eight different waveforms are produced in four locations along reader element 204.

Preferred reader element 204 further comprises signal input means 250 for receiving two signals resulting from coupling of the two capacitor elements, the metalized signal regions 262 and the reader regions of reader element 204 in combination with the eight different waveforms coupled between them. Signal input means 250 is preferably coupled to electric coupler 252 to transfer the received signals to other elements of the preferred system 200 to be described later. Signal input means 250 further is electrically isolated from the reader regions of reader element 204 by a grounded region 254 electrically depicted in FIG. 12 and physically depicted in FIGS. 9 and 10. Grounded region 254 prevents direct coupling of the eight different waveforms received by the reader regions to signal input means 250. This configuration provides a signal interlock whereby reader element 204 and calibrated reference member 202 will produce no signal unless the two capacitive elements are in parallel alignment and close physical proximity. This element arrangement insures that only lateral movement of reader element 204 will result in motion detection. Further, this preferred capacitive arrangement will tolerate some amount of "twisting" and "air-gap" between reader element 204 and calibrated reference member 202 without accumulation of a waveform resulting in measurement error. Thus, only indirect coupling of the waveforms through metalized signal region 262 is allowed.

Referring to FIGS. 11 and 12, when waveforms are applied to reader element 204 through electric couples 296, 298, 302, 304, 306, 308 and 310, reader element 204 induces signals on calibrated reference member 202 due to the capacitance developed by the close proximity of the two conductive elements, i.e., metalized signal regions 262 and the reader regions of reader element 204. These signals are then picked up by reader element 204 and signal input means 250, the latter also being known as a "wiper". Metalized signal regions 262 allow the accumulation of charge on their surfaces while the metalized ground regions 260 and 260a interrupt the charge pattern between the various metalized signal regions 262. As reader element 204 is moved, the reader regions meet alternately with metalized signal regions 262 and metalized ground regions 260 on calibrated reference member 202, thus causing a dynamic capacitance change. The resulting signal waveform from this rather complex combination of different waveforms, wave shifts and dynamic capacitance is a signal picked up by signal input means 250; in the preferred system, this signal appears as two approximately identical waveforms which are 180° out of phase when reader element 204 is at rest. The phase shift is caused by the alternating metalized signal regions 262 and the metalized ground regions 260a. When reader element 262 moves in a lateral direction, the phase shift changes. It is the phase shift modulation which produces a varying signal picked up by signal input means 262 and which indicates motion.

It can be recognized that different waveforms will be induced on metalized signal regions 262 and then will be induced on metalized ground regions 260a, that each group of reader regions will have a certain number of reader regions near metalized signal regions 262 and that some reader regions will be over metalized signal regions 260a. Depending on the direction—in a first direction or an opposite second direction—of movement, the number of reader regions over the metalized signal regions 262 will decrease or increase. In the preferred embodiment, if the number of reader regions over metalized signal regions 262 decrease, the phase shift will drop below 180°; if the number of reader regions over metalized signal regions 262 increase, the phase shift will rise above 180°. This provides a method of detecting the direction of travel of reader element 204 which can be recognized by other elements of EMS 200 to be described later. Both the magnitude and polarity of linear motion are detected by monitoring only the phase shift of the signal picked up by signal input means 250.

Since the phase shift is independent (to a certain degree) of the magnitude, and even the frequency, of the waveforms carried by the reader regions, the signal quality is highly immune from power supply variation, input noise, frequency variation and slight misalignment. This independence is because such perturbations would appear common to both of the signal waveforms picked up by signal input means 250. Since the preferred system measures only the difference in phase of the two waveforms in the signal, such "common mode" variations are ignored. This phenomenon is also known common-mode rejection.

Therefore, due to the configuration and operation of reader strip or calibrated reference member 202 in combination with reader element 204, the present system will give very accurate signals to signal input means 250 with a high degree of noise immunity and false motion signal rejection. For instance, bumping a table saw arrangement with the electric measurement system attached or starting the saw motor will not cause a change in the signal waveform received by signal input means 250.

Figure 13:
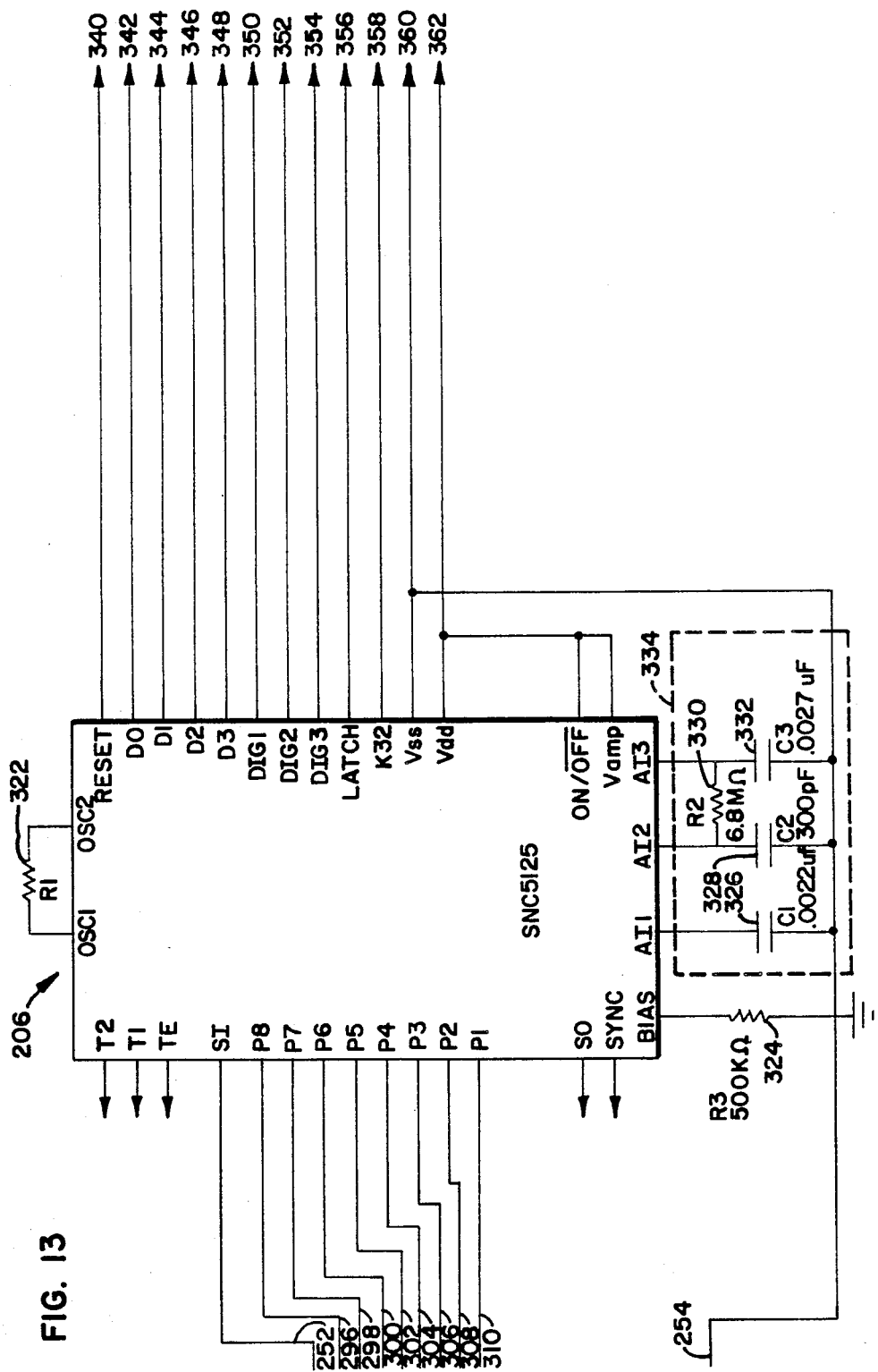
Figure 14:
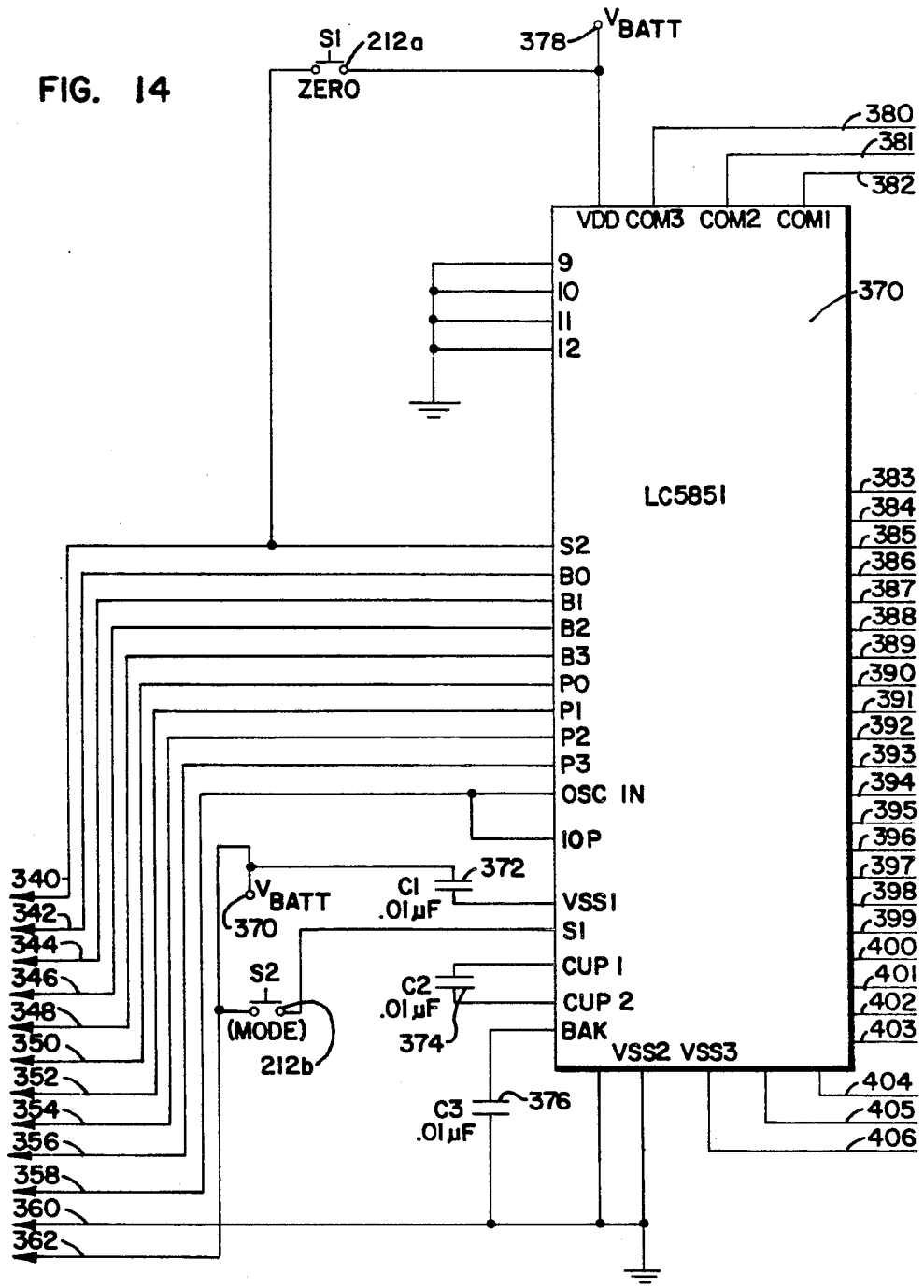

FIG. 13 shows motion detection means 206. In the preferred embodiment, a microchip known as SNC5125 available from Excel Technology International Corporation of Belmead, N.J. is used to provide many of the necessary functions for motion detections means 206. Motion detection means 206 comprises means for generating a plurality of analog waveforms.

The generation of analog waveforms is done within microchip 320. The generation of waveforms are output through electric couplers 296, 298, 300, 302, 304, 306, 308 and 310. The output waveforms are typically of the same shape and frequency but with different phase angles. The phase difference of the waveforms are proportionately larger between the waveforms carried by electric couplers 296, 298, 300, 302, 304, 306, 308 and 310 with electric coupler 310 carrying a waveform with the largest phase difference with respect to the waveform carried by electric coupler 296. Microchip 320 further comprises oscillating means for generating a clock signal. The frequency of the oscillating means is set by resistive element 322. Microchip 320 outputs the clock signal through electric coupler 358. Resistive element 324 sets the sensitivity of the amplifier input of microchip 320 coupled to electric coupler 252. By choosing a relatively large resistance in resistive element 324, high frequencies are filtered out of the signal coupled to the amplifier input of microchip 320 through electric coupler 252. Resistive element 330, as well as capacitive elements 326, 328 and 332, form a wave shaper network 334 which helps convert the analog signal received by the amplifier input of microchip 320 into a digital signal. Microchip 320 further comprises means for further converting the received analog signal into a digital signal. Microchip 230 further comprises a digital counter for storing the position of reader element 204 with respect to calibrated reference member 202. A reset input is coupled to electric coupler 340. Power is supplied to microchip 320 through electric coupler 362. An electrical ground is supplied to microchip 230 through electric coupler 362. Microchip 230 latch input is coupled to electric coupler 356. Microchip 230 also contains "hand shake" inputs which are coupled to electric couples 350, 352 and 354, respectively. Microchip 230 further comprises counter outputs which are coupled to electric couples 342, 344, 346 and 348, respectively.

In operation, motion detection means 206, also know as phase shift detection means 206, converts the analog signal received from electrical coupler 252 to a digital signal. The digital signal is indicative of the phase shift variance from 180° phase separation of the two waveforms present in the received signal. The digital signal is a pulse string, the duration of which is determined by the magnitude of the variance. Phase shift detection means 206 also produces an increment/decrement signal indicative of which mode of operation the counter should be in. The pulse string is fed into the digital counter. The digital counter will increment during the time period that the pulse string is a logical "high" and the increment/decrement signal is a logical "high". During this time period, the digital counter may increment a plurality of times if the duration of the pulse string logical "high" is long enough. Similarly, the digital counter will decrement during the time period that the pulse string is a logical "high" and the increment/decrement signal is a logical "low". During this time period, the digital counter may decrement a plurality of times if the duration of the pulse string logical "high" is long enough.

FIG. 9 shows logic means 208 and keypad means 212. Keypad means 212 comprises key 212a and key means 212b. As has previously been indicated (See Table 1 and accompanying text) key 212a is activated by an operator to zero the digital counter of motion detection means 206 or, alternatively, to toggle the direction of movement from a reference point such as "left-of-blade" or "right-of-blade". Key 212b is activated by an operator to toggle display modes of EMS 200 or, alternatively, to toggle the display precision of a particular readout.

Logic means 208 controls the operation of preferred EMS 200. In the preferred embodiment, a microchip, known as LC5851, from Tokyo Sanyo Electric Company, Ltd., is used to provide many of the necessary functions for logic means 208. Electric coupler 362 is coupled to a power supply 378. In a preferred embodiment, two size "AA" batteries, housed in battery compartment 103 behind battery door 105 (See FIG. 4), are used to supply power for EMS 200. Power supply 378 is also coupled to a power input of microchip 370 and key 212a. A decoupling capacitor is coupled between power supply 378 and another power input of microchip 370. Capacitor 374 sets the bias for an LCD readout 210 coupled through microchip 370 output couplers 380 through 405.

Figure 15:
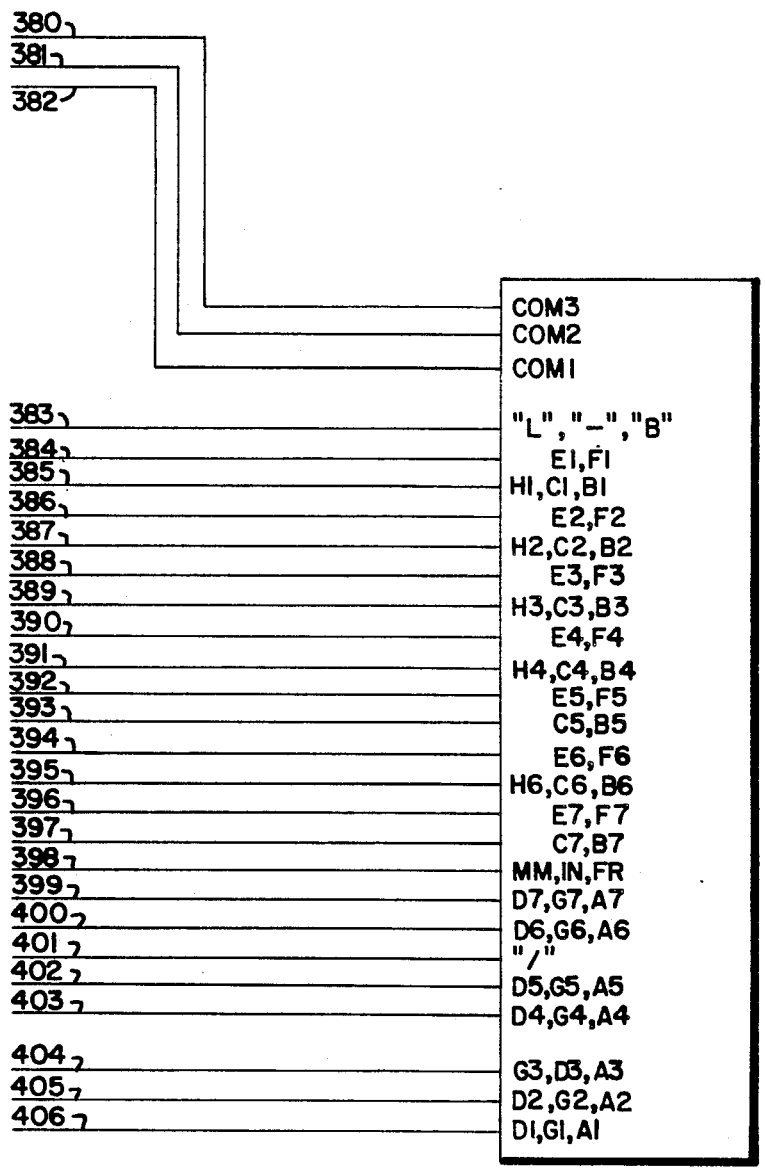

A small backup power supply preferably is maintained by capacitor 376. Capacitor 376 will retain the state of digital memory during short periods of power interruption. Microchip 370 comprises inputs 9, 10, 11 and 12 which are coupled to an electrical ground to help minimize noise input in EMS 200. Electric coupler 340 couples key 212a and a reset input of microchip 370. When key 212a is activated by an operator, a reset signal is sent to microchip 370 and to the electric coupler 340. Electric couplers 342, 344, 346 and 348 are coupled to data inputs on microchip 370. Electric couplers 350, 352, 354, and 356 coupled to digital "hand shake" outputs of microchip 370. Electric coupler 358 couplers to a clock input of microchip 370. The signal provided by electric coupler 358 determines the operational frequency of EMS 200. Electric coupler 360 supplies an electrical ground to microchip 370 and one input of backup power supply 376. Electric coupler 362 couplers key means 212b and power supply 378. When key means 212b is activated by an operator a toggle mode signal is sent to microchip 370. Electric couplers 380, 381, and 382 coupler microchip 370 outputs to back plane inputs of a display means 210 shown in FIG. 15. In a preferred embodiment display means 210 comprises a liquid crystal display (LCD) 210 readout device such as an Excelix 7304 LCD. Electric couplers 383 through 405 coupler microchip 370, outputs to the front plane inputs of display means 210 shown in FIG. 15. Electric coupler 406 couplers a signal from microchip 370, which sets the voltage level of display 210.

Logic means 208 controls the operation of EMS 200. Software embedded in logic means 208 sends out "hand shake" signals to motion detection means 206 which cause the digital counter to output data to logic means 208. Logic means 208 also has the capability of resetting the digital counter of motion detector means 206 to a zero state. The resetting allows the operator to define a reference point anywhere along reader strip or calibrated reference member 202. Due to the choice of particular devices in the preferred embodiment, EMS 200 is capable of accurately measuring linear motion at speeds in excess of 36 inches per second with an error of +/−0.001 inch.

Digital data provided by the preferred electronics is formulated by software in logic means 208 into English or metric units of measurement and then displayed on display means 210. Description of a preferred embodiment of the embedded software follows.

Figure 16:
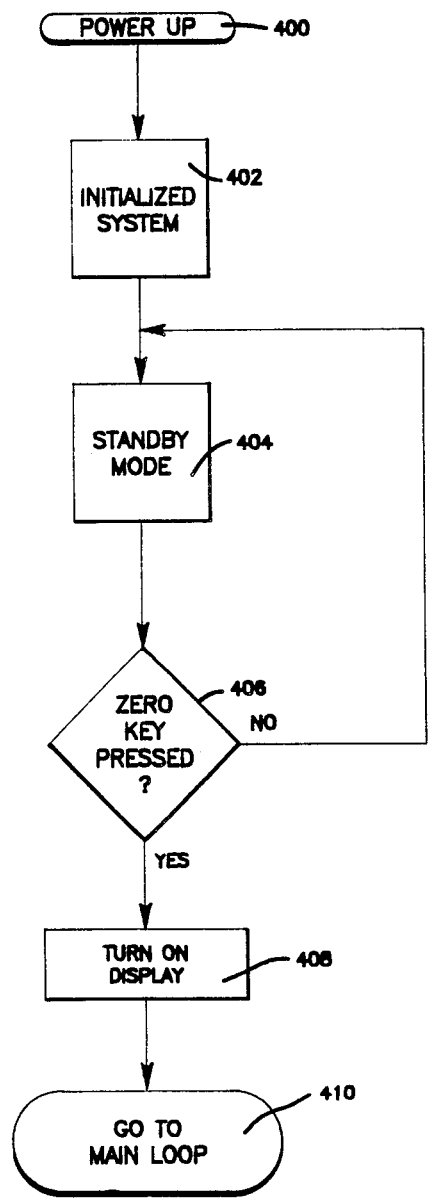
FIG. 16-19 illustrate preferred software for use with the present system.

Referring now to FIG. 16, after power up the software initializes the system 402. Certain memory locations are initialized, display 210 is blanked and a standby mode 402 is entered. During standby mode 402 EMS system 200 consumes very little power. To "wake up" EMS system 200, zero key 212a must be pressed. The software looks for zero key 212a being pressed at 406. If zero key 212a is not pressed the software returns to standby mode 404 and periodically checks for zero key 212a being pressed 406. Once zero key 212a is pressed 406, the software turns on the display at 408 and goes to a main loop 412.

Figure 17:
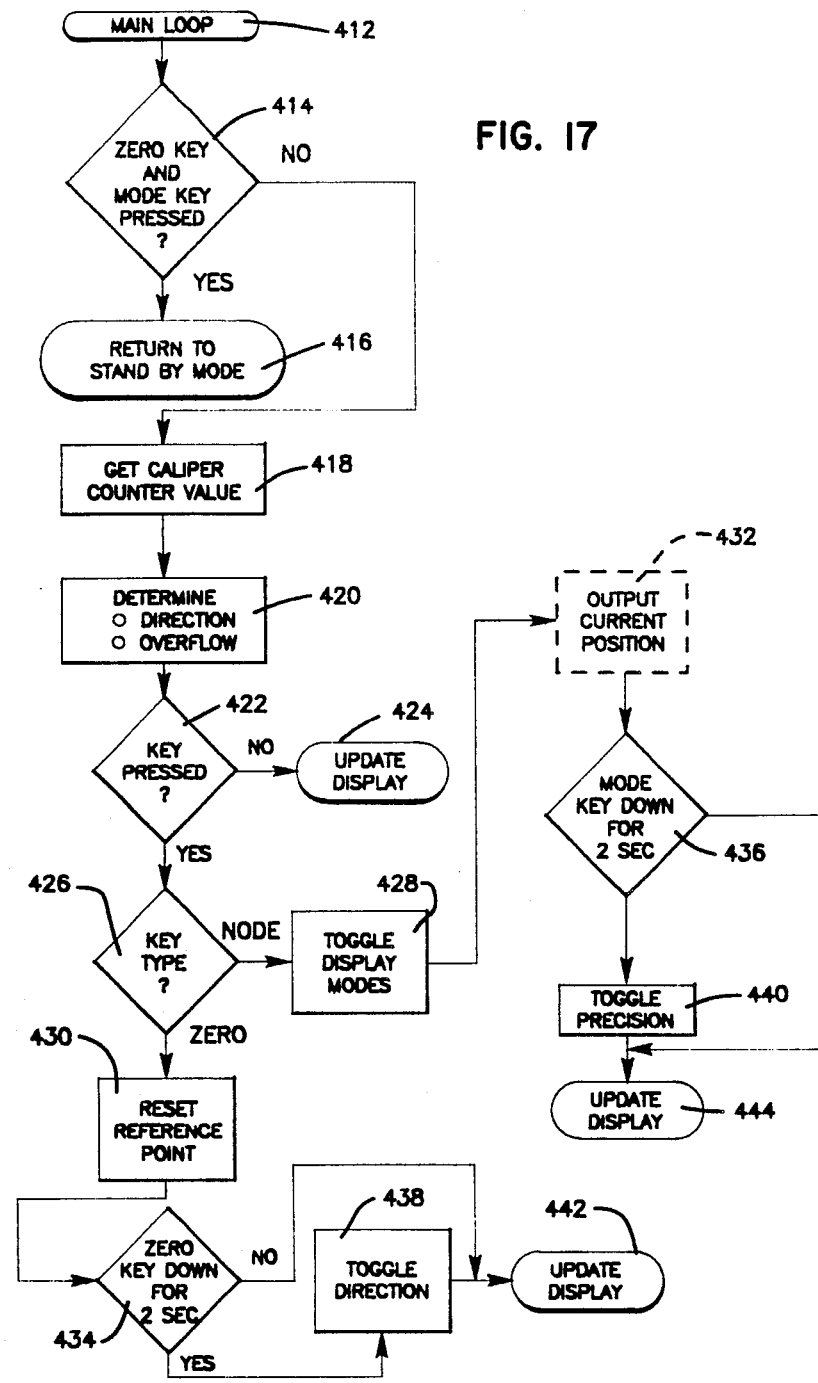

Referring now to FIG. 17, main loop 412 is a routine that monitors key pad 212 and updates display 210. If zero key 212a and mode key 212b are pressed 414, then the software returns to standby mode 416. Otherwise, the software gets the counter value 418. After getting the counter value, the software determines if the counter is counting up or counting down 420. If it is counting up, the direction of movement is positive. If it is counting down, then the direction is negative. In a preferred embodiment if EMS 200 is set in a "left-of-blade" option, the software complements the value of the counter and then determines the direction of movement to be positive or negative. This preferred embodiment "left-of-blade" option is most useful in a table saw or similar environment. Otherwise, if the software is set in a "right-of-blade" option, the software does not complement the value of the counter. The software also determines if an overflow condition has occurred 420. If an overflow condition has occurred, an overflow register is incremented. After determining direction of movement and overflow condition, the software looks for depression of user keys 212; if no user key is depressed then the software goes to routine up data display 424. If a key is pressed, then the software determines which key 212a or 212b was pressed 426. If zero key 212a was pressed the software resets the reference point 430 by resetting the digital counter of motion detection means 206 and clearing display means 210. The software then checks to see if zero key 212a has been held down for two seconds 434. If it has not been held down for two seconds then the software goes to update display subroutine 442. Otherwise if the zero key was held down for two seconds the software toggles the direction mode options 438 of EMS system 200. In the preferred embodiment, if a "left-of-blade" mode of operation was in effect then the software is toggled to a "right-of-blade" mode of operation. Otherwise if a "right-of-blade" mode of operation was active then the software is toggled to a "left-of-blade" mode of operation. Once the software has been toggled between different directions, the software goes to update display subroutine 442.

If the mode key was pressed 426, then the software enters a toggle display modes option 428. During the toggle display modes 428 operation the software toggles from one set of units of measurement to the next. In the preferred embodiment the software toggles between metric, English decimal and English fractional units of measurement. Optionally, the software outputs the current position of the device 432 to a serial port on logic means 210. Otherwise the software checks for mode key 212b being pressed for two seconds. If the mode key is not depressed for two seconds then the software goes to subroutine update display 444. Otherwise if the mode key is depressed for two seconds, the software toggles between different display precisions 440. In the preferred embodiment two ranges of precision are used. They are termed low precision or resolution and high precision or resolution respectively. If the software was running in low precision then the software changes to high precision mode of operation. If the software was running in high precision mode of operation then the software changes to low precision mode of operation. The software then goes to subroutine update display 444.

Figure 18:
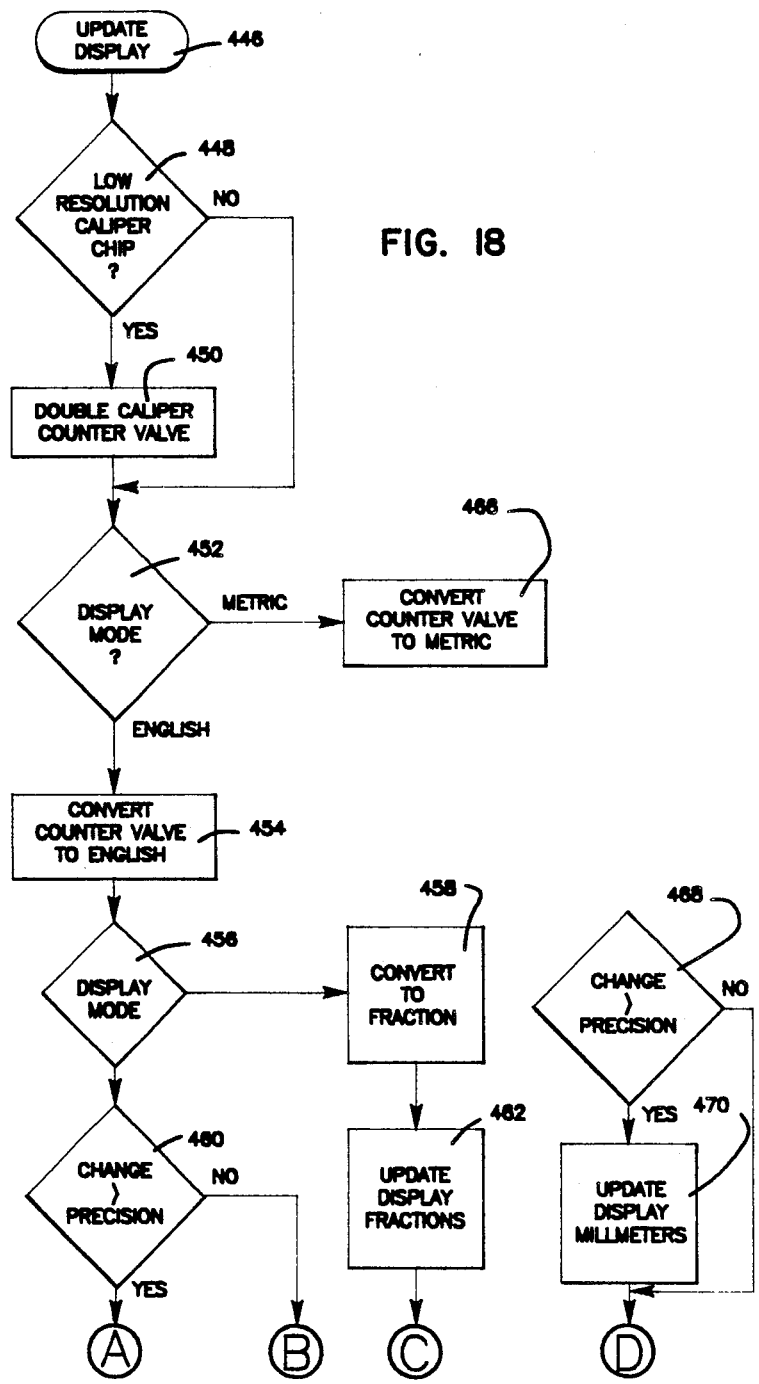
Figure 19:
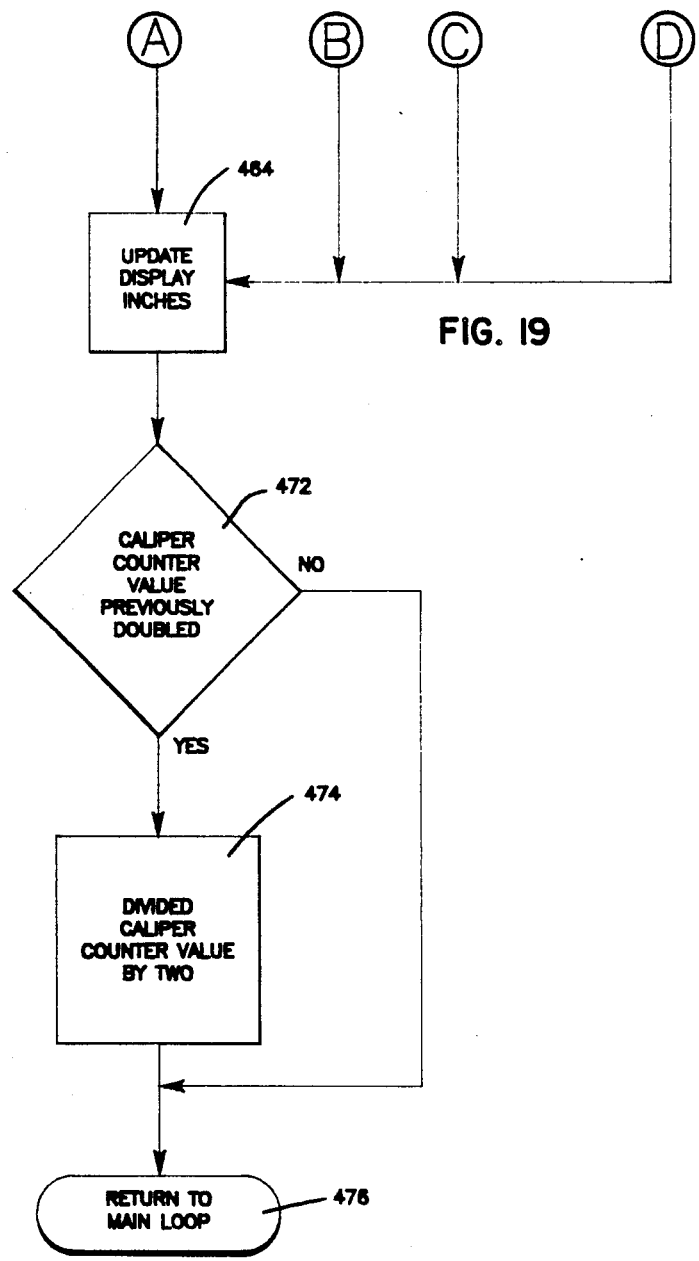

In the preferred embodiment two different resolution microchips 320 are used. Upon entering update display subroutine 446, the software determines which resolution microchip 320 is being used 448, as shown in FIG. 18. If the low resolution microchip 320 is not used, the software checks which display mode is in operation 452. Otherwise, if a low resolution microchip 320 is being used by EMS system 200 the software doubles the counter value 450 and checks which display mode is in operation 452.

If the display mode in operation is an English display mode, then the software converts the counter value to an English decimal value 454. The system then determines if the display mode is fractional or decimal 456. If the fractional mode of operation is currently set, then the software converts the English decimal counter value to a fractional value 458 and does a subroutine update display of fractions 462. During subroutine update display fractions subroutine 462 display means 210 is updated to show an English fractional units. Further, the English fractional position value displayed by display 210 is the lowest common denomination (LCD); for instance, if the fractional value is 12 16/32 then the display means displays 12 ½. Otherwise, if the display mode is a decimal display, the software determines if the change in the counter value is greater than the precision setting of the software 460. If the change in counter value is smaller than the precision setting of the software then the software checks to see if the counter value was previously doubled during this main loop sequence 472. Otherwise if the change in counter value is greater than the precision setting of the software, an update display inches subroutine 464 is entered. During update display inches subroutine 464, display means 210 is updated to slow the present position of reader head means 204 position relative to a reference part sent by the operation in English decimal units. The software then checks to see if the counter value was previously doubled 472 during this main loop sequence.

If the software is in a metric display mode 452 then the software converts the counter value to a metric value 466. The software then determines if the change between this counter value and the previous counter value is greater than the precision setting of the software 468. If the change in counter value is not greater than the precision setting of the software, then the software checks to see if the counter value was previously doubled 472. Otherwise if the change in counter value is greater than the precision setting of the software, the software enters a subroutine update display millimeters 470. During update display millimeters subroutine 470 display means 210 is updated to show the present position of reader element 204 relative to a reference point set by the operator in millimeters. Then, the software checks to see if the counter value was previously doubled 472.

If the counter value was not previously doubled, the software goes to the main loop subroutine and starts a new sequence 476. Otherwise, software divides the counter value by two 474 and goes to main loop subroutine 476 and starts a new main loop sequence.

In addition to the linear measurements discussed thus far, the present system can easily be configured to generate highly precise angular measurements, thus enabling the development of devices having substantially enhanced precision with respect to angular settings. Examples in the woodworking industry include radial arm saw angular settings and tilting arbor table saw angular settings having substantially enhanced accuracy over those disclosed in U.S. Pat. No. 4,641,557 assigned to Emerson Electric.

Further, in addition to having substantially enhanced precision over the tools disclosed in U.S. Pat. No. 4,641,557, tools and other devices using the preferred reader element standoff feature of the present system will also have greatly enhanced longevity without repair over these prior art tools. As previously indicated, the measurement systems in these prior art tools are subject to considerable wear and other breakdown due to the foam-biased intimate contact between the reader strip and the reader element.

Use of the present system to make highly precise angular measurements with a measurement system having great longevity can be accomplished in at least two ways. One approach is to apply reader strip or calibrated reference member 202 to the column or post about which the angle is being measured (e.g., the radial arm saw column about which the arm pivots, a miter box cylindrical portion about which a rotating table pivots, or a miter gauge column about which a miter head pivots) and to configure the reading surface of reader element 204 to have a curvature substantially matching the curvature of the corresponding column. This approach could also employ the preferred reader element standoff feature of the present system, as well as the preferred capacitive measurement electronics of the present system, which account for the increased longevity and precision of the present system over the systems disclosed in the previously mentioned patent assigned to Emerson Electric.

Another approach to using the present system to create highly accurate angular measurements is to configure the reader strip or calibrated reference member 202 as a protractor lying in a substantially flat plane and to configure a corresponding reader element 204 having a substantially planar surface. In such a configuration of the present system, the preferred metalized ground regions 260 and 260a as well as signal regions 262 of the preferred reader strip or calibrated reference member 202 are preferably oriented radially about the pivot point, and metalized reader regions 266 are preferably also configured in the same manner. As with the previously described approach to applying the present system to make angular measurements, the preferred reader element standoff feature and the preferred capacitive electronics of the present system could be employed. Alternately, either of these approaches could be implemented with optical, magnetic, or resistive electronics, either with or without the preferred reader element standoff feature of the present system.

In using still another approach with the present system to make angular measurements, the present hardware and software may be reconfigured to convert x and y coordinates to angular coordinates.

The unique combination of mechanical, electronic and software subsystems in the present system combine to provide much of its flexibility and adaptability to a wide variety of tools and other devices, while at the same time providing high precision, and substantial longevity at a relatively low cost. As has previously been mentioned, its unique reader element standoff feature increases longevity and, when used with the preferred capacitive measurement electronics, provides highly precise measurements using a low cost molded reader head and a low cost extruded guide rail. The preferred wiper springs 122 configuration plays an important role in providing the substantially nominal reader element 204 standoff, while at the same time providing "independent suspension" at each wiper spring to permit the reader element standoff to vary whenever perturbations such as those found in extruded guide rail material are encountered. Importantly, the preferred capacitive measurement system electronics permit highly accurate measurements in spite of the nominally constant reader element standoff and the permitted variations. This is in contrast to prior art capacitive measurement systems requiring substantially intimate contact between the reader strip or calibrated reference member and the reader element. The preferred configuration of wiper springs 122 also maintains a fixed lateral position of reader element 204 in reader head 100 while permitting the nominally constant standoff between reader element 204 and reader strip or calibrated reference member 202 to occur.

While the precision and longevity of the present system are accomplished through its preferred capacitive measurement electronics and reader element standoff subsystems, the flexibility of the system to easily provide metric, English, decimal and fractional units, to provide both linear and angular system readouts, to provide a bidirectional direct read measurement (such as of right-of-blade and left-of-blade) and to provide the preferred ranges of resolution, are all the result of also incorporating the preferred software subsystem. This unique combination can be tailored to meet the needs of virtually any industry. For example, through easily made modifications, the preferred software subsystem can provide measurements in yards for use by the textile and clothing industries.

Accordingly, the present system provides a measurement system having hardware means comprising hardware for configuring the physical structure of the measurement system; electronic means comprising electronics for providing a direct display readout of the measurement without the need for interpretation of a mechanical analog scale and reader element; and software means comprising software for converting the display to desired units of measure without the need for human measurement conversion.

It will be readily apparent to those skilled in the art that many modifications to the preferred embodiment of the present invention are possible without deviating from the scope and spirit of the present invention. For instance, it will be readily understood by those skilled in the art upon reading and understanding this specification and drawings that the control structure of the present invention may be implemented in a variety of different ways, including the use of different microprocessor control, ROM microcode control, PLA or PAL logic structures and other types of hard-wired or software-controlled machines.

Thus, while the present invention has been described in connection with preferred embodiments thereof, it will be understood that many modifications will be readily apparent to those of ordinary skill in the art. Therefore, it is intended that this invention be limited only by the claims and the equivalents thereof.

What is claimed is:

1. A measurement system, comprising:
   (a) reader head means comprising a reader element configured to move along a calibrated reference member for making an electrically derived measurement relative to the location of the element on the calibrated reference member, said reader head means including means for attaching said reader element to a device for movement along said calibrated reference member which may be positioned in a variety of orientations;
   (b) display means for electronically digitally displaying the measurement, the display means comprising flexible coupling means for flexibly connecting the display means to the reader head means so that the display means can display the measurement of the reader head means; and
   (c) means for detachably mounting said display means in a preferred reading position on said reader head means in a first reader head orientation when said calibrated reference member is positioned in a first reference member orientation, and means for permitting the detachment of said display means from said reader head means without breaking said coupling means, said means for detachably mounting including means for reattaching said display means on said reader head means in a subsequently preferred reading position after the orientation of said reader head means has changed from said first reader head orientation caused by said calibrated reference member having changed its orientation from said first reference member orientation.

2. The system of claim 1 wherein:
   (a) the calibrated reference member comprises one element of a capacitor; and
   (b) the reader element comprises the other element of the capacitor.

3. The system of claim 1 wherein the display means comprises a liquid crystal display.

4. The system of claim 1 wherein the display means comprises means for displaying the measurement in decimal units.

5. The system of claim 1 wherein the display means comprises means for displaying the measurement in fractional units.

6. The system of claim 1 wherein the display means comprises means for displaying the measurement in both decimal and fractional units.

7. The system of claim 1 wherein the display means comprises means for displaying the measurement in fractional units having the lowest common denominator.

8. The system of claim 1 wherein the display means comprises means for displaying the measurement in English units.

9. The system of claim 1 wherein the display means comprises means for displaying the measurement in metric units.

10. The system of claim 1 wherein the display means comprises means for displaying the measurement in both English and metric units.

11. The system of claim 1 wherein the display means comprises means for establishing a zero reading at any location of the reader head means.

12. The system of claim 1 wherein the display means comprises means for providing the measurement in either of two ranges of precision.

* * * * *

UNITED STATES PATENT AND TRADEMARK OFFICE
CERTIFICATE OF CORRECTION

PATENT NO. : 4,982,509

DATED : January 8, 1991

INVENTOR(S) : David J. Luttmer et al.

It is certified that error appears in the above-identified patent and that said Letters Patent is hereby corrected as shown below:

Col. 5, line 37, "&.hat" should read --that--.

Signed and Sealed this

Seventh Day of July, 1992

Attest:

DOUGLAS B. COMER

*Attesting Officer*     Acting Commissioner of Patents and Trademarks